US007603432B2

(12) United States Patent
Warner

(10) Patent No.: US 7,603,432 B2
(45) Date of Patent: Oct. 13, 2009

(54) LOCALITY BASED ALERT METHOD AND APPARATUS

(75) Inventor: Chris J. Warner, Scottsdale, AZ (US)

(73) Assignee: AA, LLC, Phoenix, AZ (US)

( * ) Notice: Subject to any disclaimer, the term of this patent is extended or adjusted under 35 U.S.C. 154(b) by 354 days.

(21) Appl. No.: 11/144,611

(22) Filed: Jun. 6, 2005

(65) Prior Publication Data

US 2006/0273893 A1 Dec. 7, 2006

(51) Int. Cl.
*G06F 15/16* (2006.01)

(52) U.S. Cl. ..................................................... 709/217

(58) Field of Classification Search ......... 709/217–219, 709/230, 231, 238, 245; 707/1, 10
See application file for complete search history.

(56) References Cited

U.S. PATENT DOCUMENTS

| | | | | |
|---|---|---|---|---|
| 6,882,706 | B2 | 4/2005 | Andrew | |
| 7,171,190 | B2 * | 1/2007 | Ye et al. | 455/412.1 |
| 2002/0180803 | A1 * | 12/2002 | Kaplan et al. | 345/810 |
| 2003/0195670 | A1 * | 10/2003 | Smith et al. | 701/1 |
| 2005/0086685 | A1 * | 4/2005 | Rahman et al. | 725/33 |
| 2005/0210511 | A1 * | 9/2005 | Pettinato | 725/61 |
| 2006/0206568 | A1 * | 9/2006 | Verma et al. | 709/206 |
| 2006/0242652 | A1 * | 10/2006 | Stearn | 719/318 |

* cited by examiner

*Primary Examiner*—Jeffrey Pwu
*Assistant Examiner*—Scott M Sciacca
(74) *Attorney, Agent, or Firm*—Quarles & Brady LLP

(57) ABSTRACT

Information about emergency situations is securely collected and processed by an agency, such as the local police force. When the information is approved for distribution as an emergency alert of a particular type, the alert is transmitted to a server. The server in turn facilitates the distribution of information widely to the public, and on a locality by locality basis. The server may format the emergency alert message or information for a variety of devices and send the information to those devices to convey the information to the public. The devices may include, for example, wireless devices, such as cell phones, personal digital assistants or any other type of wireless device; computers; electronic road signs; EAS equipment; computers and webpages; and any other type of output device. The server may also act as a web portal to disseminate information to the public and to allow members of the public to sign up to receive emergency alerts in particular localities, for example by zip code, at no cost to government or the public.

11 Claims, 5 Drawing Sheets

LOCALITY BASED ALERT METHOD AND APPARATUS

FIELD OF THE INVENTION

The present invention relates to a system and method for processing, confirming and distributing emergency information throughout a locality affected by an emergency in a timely and efficient manner and, more specifically, to the use of technology, including computer, wireless, network and broadcast technology for enabling authorities and the public to interact to report and disseminate emergency information promptly, widely and accurately.

BACKGROUND OF THE INVENTION

In many types of emergency situations, the accurate and rapid dissemination of information is important, and in many cases can avert or reduce the severity of the emergency. The Emergency Alert System is one example of a system that is presently in use in the United States for broadcasting information about an emergency to the public. Generally, a government agency generates messages for the EAS system, which are then transmitted to EAS system equipment at radio and television broadcast stations which in turn broadcast the messages to the public. These messages may alert the public to severe weather information or other hazardous conditions about which the public needs to be informed.

There is a general problem, however, with the emergency alert system. In general, it may take hours from the time an emergency situation is reported to the authorities to the time that the emergency situation is documented, approved for dissemination and is actually broadcast. The time lag is particularly devastating in the case of child abductions and other local emergencies that are immediate threats to public welfare. In the case of child abductions, harm is most often done to the child within 2-3 hours of an abduction. In other emergency situations, prompt notification can help to contain or minimize damage.

Accordingly, there is a need to increase the speed of disseminating information about emergency situations to the public. There is a further need to ensure that the information is disseminated to as wide a number of people as possible in localities that are affected. There is a further need to increase the accuracy of emergency alerts, and involve law enforcement and other agencies in the reporting process so that the most accurate and best information is circulated as quickly as possible.

SUMMARY OF THE INVENTION

According to an embodiment of the present invention, information about emergency situations is collected and processed by any state or local agency, such as the state or local police force through a secure Internet interface. When the information is approved for distribution as an emergency alert of a particular type, the alert is transmitted to a server. The server in turn automatically converts the alert into many different formats and facilitates the distribution of information widely to the public, and on a locality by locality basis. For example, the server may format the emergency alert message or information for a variety of devices and send the information to those devices to convey the information to the public. The devices may include, for example, wireless devices, such as cell phones, personal digital assistants or any other type of wireless device; computers; electronic road signs; EAS equipment; computers and webpages; and any other type of output device. The server may also act as a web portal to disseminate information to the public and to allow members of the public to sign up to receive emergency alerts in particular localities, for example by zip code. In addition, various processes described herein may be used to capture and store information for the purpose of being used in case of an emergency.

According to one embodiment of the invention, a method of distributing emergency alerts includes receiving emergency information from an agency, in a secure and predetermined format, authenticating the emergency information and creating and distributing a URL associated with the emergency information. The method may further include translating the emergency information into different formats associated with a plurality of different devices and transmitting the formatted emergency information to each of the respective plurality of different devices. Each of the devices may be associated with alerts in different localities and the method may further include determining at least one affected locality associated with emergency information and performing the translating and transmitting with respect to each user device associated with the affected locality, which may change over time. The method may be applied to the abduction of a child with the emergency information specifying the pertinent details and images and sketches of the child, suspect, vehicles involved and other information to the extent available.

According to another embodiment of the invention, a method of handling an emergency, includes collecting information on an emergency, storing the information according to a predetermined format, authenticating the emergency and transmitting the emergency information and authorization to a server for distribution of the emergency information to a plurality of devices and capture all the alert information for detailed historical reporting.

According to another embodiment of the invention, a method of distributing emergency alerts to the public may include receiving information identifying at least one user device on which to receive emergency alerts and localities; receiving emergency information from an agency having a predetermined format; translating the emergency information into another format usable by each of the user devices; and transmitting the translated emergency information to the devices.

According to still another embodiment of the invention, a system for handling emergency alert distribution may include a user alert database, an emergency information database and a server. The user alert database is accessible via a network that stores information identifying many different types of user's devices and localities. The emergency information database stores emergency information. The server is coupled to the databases and allows users to access and identify user devices and localities. The server also allows agencies to authenticate the emergency information for distribution as an emergency alert. The server includes software that translates emergency information stored in a predetermined format into a plurality of different formats associated with different devices. The formats may include an EAS system format, electronic traffic sign formats, a web page format, an electronic mail format, a wireless device format, satellite and a mobile telephone format.

BRIEF DESCRIPTION OF THE DRAWINGS

The above described features and advantages of the present invention will be more fully appreciated with reference to the detailed description and figures, in which.

DETAILED DESCRIPTION

According to an embodiment of the present invention, information about emergency situations is collected and processed by an agency, such as the local police force. When the information is approved for distribution as an emergency alert of a particular type, the official alerting partners is authenticated and then allowed to transmit an alert to a server. The server in turn facilitates the distribution of information widely to the public, and on a locality by locality basis. For example, the server may format the emergency alert message or information for a variety of devices and send the information to those devices to convey the information to the public. The devices may include, for example, wireless devices, such as cell phones, personal digital assistants or any other type of wireless device; computers; electronic road signs; EAS equipment; computers and webpages; and any other type of output device. The server also acts as a web portal to disseminate information to media the public and other alerting partners allowing all of them to sign up to receive emergency alerts in particular formats and in particular localities, for example by zip code. In addition, various processes described herein may be used to capture and store information for the purpose of being used in case of an emergency. The Web Portal also allows for the media and other alerting partner to actually pull the real-time content from Web Portal and display it on their individual sites.

Figure 1:
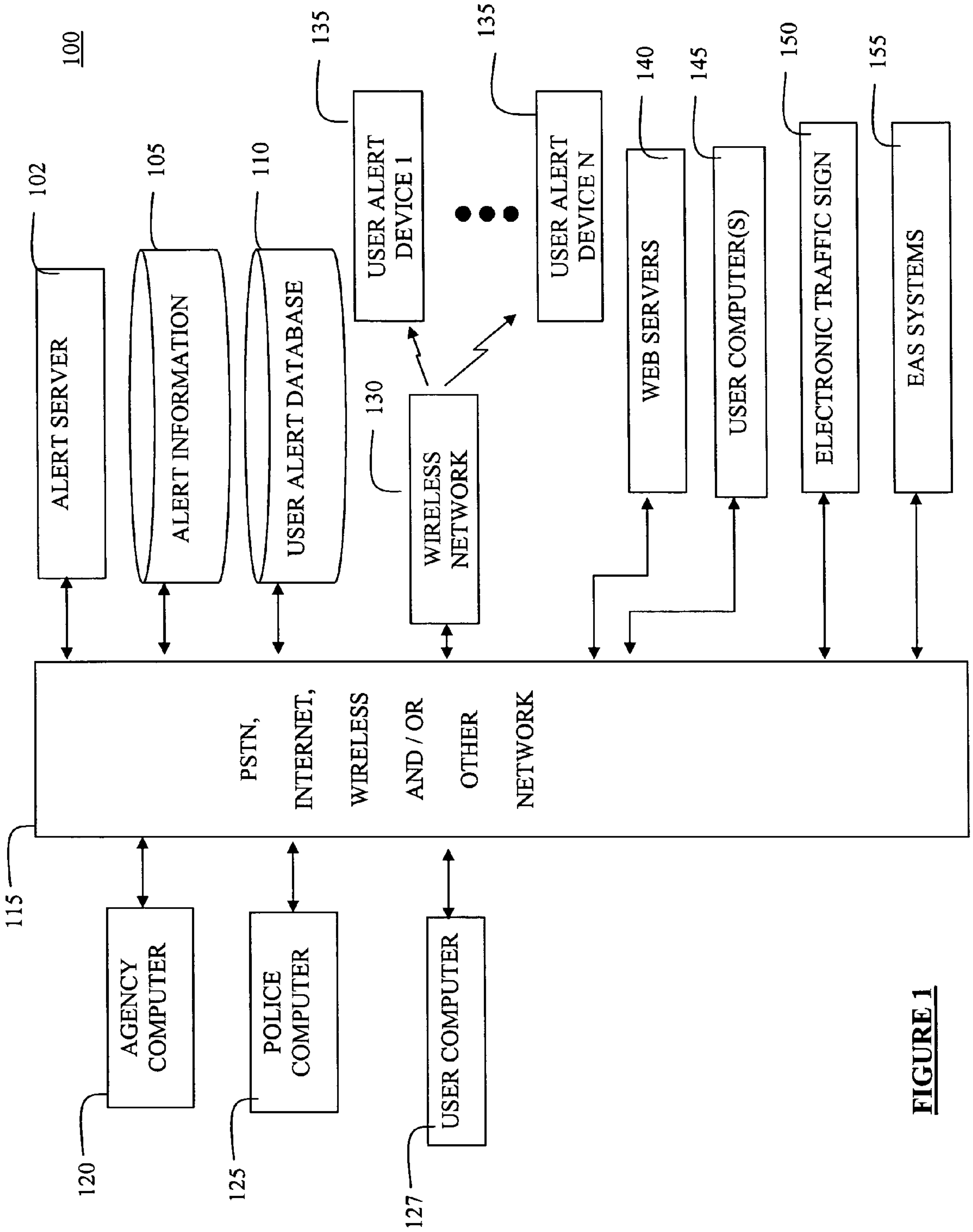
FIG. 1 depicts a functional block diagram of a system for collecting alert information and distributing the information pursuant to emergency alert processes and for other purposes according to an embodiment of the present invention.

FIG. 1 depicts an illustrative block diagram of a system 100 for collecting emergency information and distributing the information through a server to various media and devices according to an embodiment of the present invention. FIG. 1 is discussed initially to provide an overview of the different aspects of the system 100 for collecting emergency information and generating alerts. An illustrative process for generating and distributing emergency alerts are discussed in more detail below with reference to FIG. 5.

Referring to FIG. 1, emergency information is inputted securely and stored in an alert information database 105 coupled to a network 115 via an alert server 102. Also coupled to the network 115 and used to provide emergency information to the alert information database 105 are computers at a government agency, such as the agency computer 120, or computers associated with a police department, police office or squad car, such as the police computer 125. In addition, user computer systems 127 are coupled to the network 115 to allow users to sign up to receive emergency alert information through one or more devices. In addition, a plurality of devices and media may be coupled to the network 115 to receive emergency alerts when issued. For example, wireless user alert devices 135, which may comprise cell phones or PDA's or any other device capable of receiving and displaying information, may be coupled to the network 115 through a wireless network 130. In addition, a web server 140 and user computers 145 may be coupled to the network 115 to receive emergency alert information. Also, electronic traffic signs 150, EAS systems 155 and other public notification devices may be coupled to the network 115 to receive emergency alerts. A user alert database 110 is used to store user information and alert information defined by users as discussed in more detail below.

The server 102 may be any general purpose computer, including a server, and may be used to facilitate the provision of emergency information between government agencies, including the police, and the public through various devices and media. According to one embodiment of the invention, the server interacts with members of the public who desire to sign up to receive emergency alerts affecting particular geographic areas, for example, certain zip codes, states or the entire nation. The user interacts using a computer 127 interacts with the server 102 and the user alert database 110 in order to identify devices on which the user desires to receive emergency alert information in particular geographic areas. According to one embodiment of the invention, the alert server 105 displays web pages that are accessible over the Internet that allow a user to sign up to receive alerts. Generally, this occurs by the user filling in a web page to provide information about the user's devices and about the user, such as the user's mobile telephone number, email address or other identifier, the zip codes that the user desires to receive alerts with respect to, and other information, such as, optionally, a login ID and password used to allow the user to access and update the information.

The alert information database 105 is a relational database that stores emergency information received from an agency or police computer regarding an emergency alert that needs to be issued by the server 102. Generally, the emergency information may be associated with an address, zip code, or intersection which identifies the location of the emergency event, such as a kidnapping, a hazardous condition, such as a fire or a chemical spill, or severe weather. In general, the emergency information includes details that are sufficient to permit the public on notice of the emergency and respond appropriately. In the case of a kidnapping, the emergency information may include a description/picture of: the child or other person abducted, including gender, age, height, weight, complexion, eye color, hair color, a photograph or other image, and a description and other information; a description of the abductor and a sketch or other image; a description of the circumstances of the abduction, including the location by intersection or address; a description of the automobile used by the abductor and other information. In general, the emergency information will include location information, a description of the emergency and locations affected by the emergency alert.

The user alert database is a relational database and includes information about users that are interested in receiving emergency alerts on a user's device, such as a mobile phone, a computer, a wireless personal digital assistant or other device capable of receiving information. In general, the user alert database allows a user to register with the server 102, identify an email address, a cell phone number and/or other information to identify one or more devices or channels through which the user desires to receive alerts. Each device may operate according to a different protocol. Accordingly, the database identifies the type of devices through which the user desires to receive alerts, such as a mobile phone, BLACKBERRY, computer or other device. The server includes software that allows it to translate emergency information from the emergency information database to a format and a protocol suitable for each permitted device registered for a particular user.

For example, when the user selects a mobile device, the user information may include a mobile phone number and a mobile provider to properly configure a SMS message. When the user selects an email address or a text message, an email or text message may be generated, for example, by the mail function of PHP. When an alert application resident on the user's computer is selected, the user's computer may check a link on the website to determine from the link whether there is any emergency information affecting a locality identified for the user. The computers 120 and 125 may each be a server or other general purpose computer that runs computer programs. In general, the computers 120 and 125 are used by agency personnel to document emergency information for distribution as an alert through the server or portal 102. One of the computers may be used to enter all of the details of an emergency event and another may be used to create a digital certificate or credential and communicate it to the server 102 in order to authenticate the emergency event as one coming from a recognized agency so that when the emergency information is entered it may be transmitted to the server 102 and disseminated to the public. Depending on the type of emergency, the information may be collected by, for example, a police office entering emergency information for an emergency event, such as a kidnapping, into a web paged provided by the server 102. The information may be uploaded to the database 105 in any convenient manner, including storing the information entered into the web page into the database. Other alternatives include sending the emergency information in an email and any other technique for promptly and accurately conveying the information.

The network 115 (and any other network described herein) may be a local area network, a wide area network, the public switched telephone network, the interconnected backbones, routers, bridges, switches and servers known as the Internet, other communications links and combinations thereof. The network may include direct electrical connections, wireless, optical or any other communications links, including analog, digital, circuit switched, packet switched, and combinations thereof for transmitting information.

The user system 127 and 145 may each be a general purpose computer system, a server, a personal digital assistant or any other device or hand held device that permits the exchange of information via the network 115 with the server 102. According to one embodiment of the invention, the user system is a general purpose computer that executes computer software, including browser software, that permits the display of web pages generated by the server 102. The system may also permit the exchange of information between the server 102 and input/output devices associated with the user system. The user system may be used by the user to sign up to receive emergency alerts in particular localities, for example by zip code, or to otherwise interact with information available from the server 102 and the associated databases.

Figure 2:
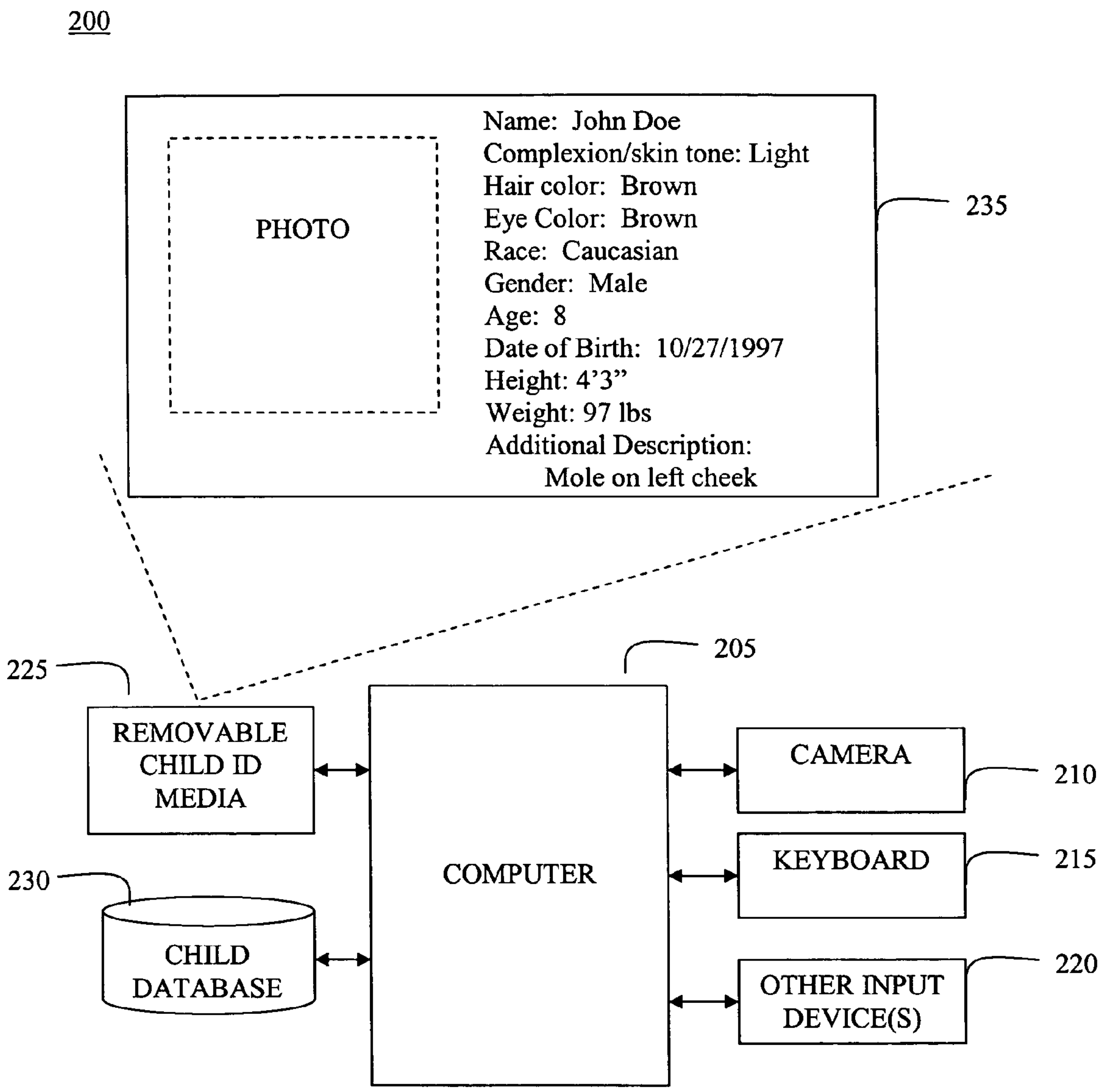
FIG. 2 depicts a functional block diagram of collecting information on a child and storing the information in a storage media for later use, including use in the event of an emergency, according to an embodiment of the present invention.

FIG. 2 depicts a functional block diagram of a system 200 for collecting information on a child and storing the information in a storage media for later use, including use in the event of an emergency, according to an embodiment of the present invention. Referring to FIG. 2, the system includes a computer 205, a camera 210, a keyboard 215 and other input/output devices 220, removable storage media 225 and an optional database 230. The system 200 is used to photograph a child and store the photograph onto a removable storage media along with other information about, for example a child. The information is stored in a particular format that readily permits the storage media to be inserted into the computer of an agency or a police officer and the information retrieved and used in generating emergency information for the server 102. Parents, for example, may take their children to be photographed and otherwise documented by the system 200 so that in the event of an emergency involving the child, the parents can take the removable media/CD to the police to facilitate describing the child to the police. Having such a removable storage media documenting a child's identification may reduce the time it takes to report a missing child by a significant margin. Information collected about a child is illustratively shown as information 235 stored in the storage media. Optionally, the information 235 may be stored in a database of registered children that is accessible by agencies, the police, and/or the server 102. Additionally, hair samples may be kept by parents to facilitate identification and any other convenient information.

Figure 3:
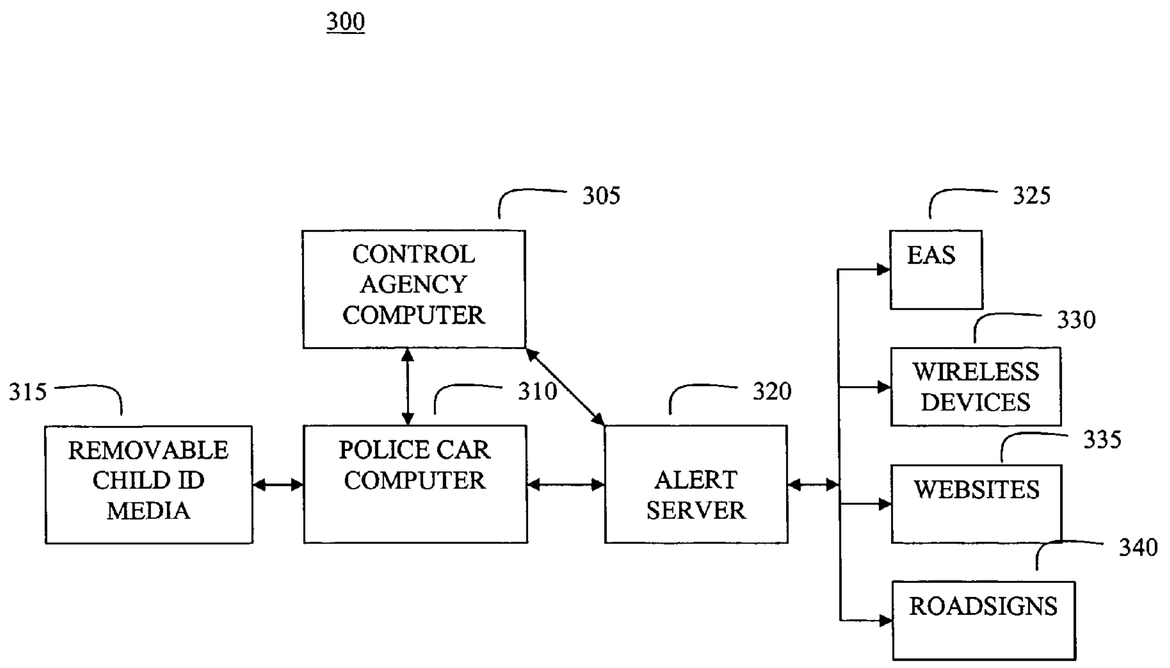
FIG. 3 depicts a functional block diagram of a system for delivering an emergency alert from a police field or office computer, for example, in a squad car, through an alert server to a plurality of different types of media and devices, according to an embodiment of the present invention.

FIG. 3 depicts a functional block diagram of a system 300 for delivering an emergency alert from a police computer, for example, in a squad car, through an alert server to a plurality of different types of media and devices, according to an embodiment of the present invention. Referring to FIG. 3, a police computer 310 and an agency computer 305 are coupled to the alert server 320. The police computer 310 is used to enter information about an emergency event, such as a child abduction. As previously described, the police computer may enter the information into a webpage served by the server 320 or may enter the information into a database pursuant to a program running on the police computer. The agency computer 305 may be used to generate a digital certificate or other credential and may send the credential to the server 320 or the police computer to authorize the police computer to generate an alert.

When a member of the public reports an emergency event, such as a child abduction, to the police in person, if the person can provide the police with the removable media on which the child or other victim has information stored, the police may plug the media into the computer to retrieve information from the media that will be uploaded to the server 102. Child ID media automatically syncs with the server uploading all of a child's information. In, for example, one click, detailed information is transmitted though an encrypted system between media and server after insertion. The emergency information will be entered more quickly when the removable media is used. Once the emergency information is collected and the emergency authorized as one that may invoke the alert portal, the emergency information may be uploaded from the computer to the emergency alert database via the server 102.

From the sever 102, the emergency information may be formatted into numerous different formats, depending on the type of emergency and the type of device. For example, the server may push the alert out to the EAS system 325 by emergency alert information over the Internet to the EAS system. An illustrative system for transmitting emergency information over the Internet to an EAS system is shown in patent application publication number US 2005/0086685, published on Apr. 21, 2005. The server may push the alert out to wireless devices 330 registered to receive alerts in the geographic area affected by the emergency. The server may also generate a URL and content associated with the emergency alert. This URL is accessible by other servers and computers on the Internet. The server 102 and other servers on the Internet may be configured to automatically embed the URL of the emergency alert into other websites so that when there is an emergency alert, the content of the alert is pushed into multiple portals accessible over the Internet. Still another device that may receive emergency messages is an electronic traffic signs. For example Department of Transportations may want information in multiple formats to activate different forms of communication they utilize during alerts. The server may creates these different formats and may feed reformatted data to DOT upon receipt of an alert input. Any other device capable of receiving and presenting information may be used to receive information in a suitable format from the server 102.

Figure 4:
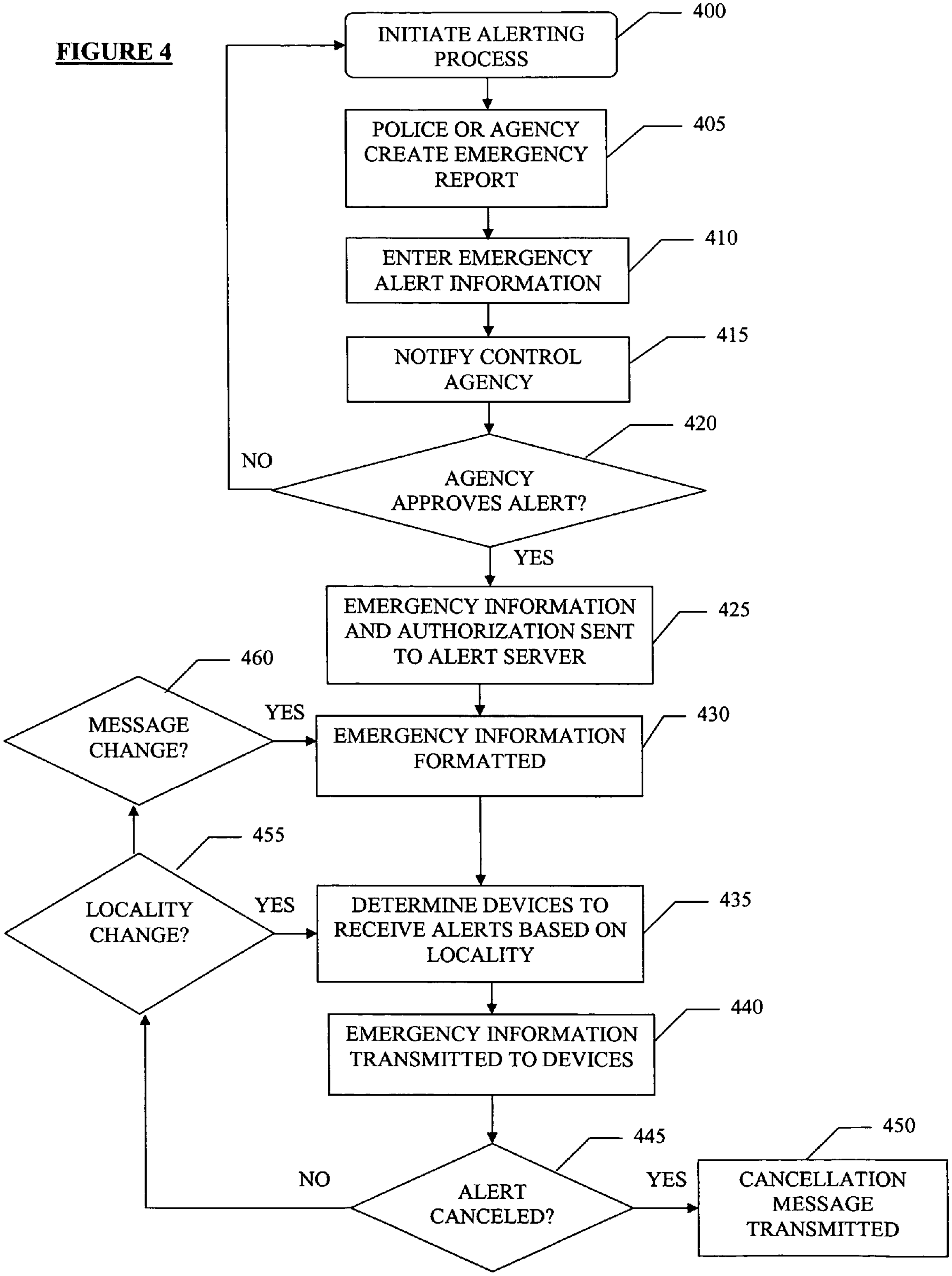
FIG. 4 depicts a method of providing emergency alerts to the public through various media and devices, according to an embodiment of the present invention.

FIG. 4 depicts a method of providing emergency alerts to the public through various media and devices, according to an embodiment of the present invention. Referring to FIG. 4, in step 400, the emergency alert process is initiated. This initiation typically occurs when a member of the public contacts the local authorities to report an emergency, such as a kidnapping or a hazardous condition. An emergency alert process may also be initiated by a government agency that becomes aware of an emergency situation through its own monitoring, for example, of the weather, seismic events, its own facilities or borders, or any other situation.

Once the alerting process has been initiated, the police or agency create an emergency report in step 405. The creation of an emergency report can be time consuming, because the police have to collect as much information as possible about the emergency prior to initiating the alert. In particular, in the case of a kidnapping of a child, the police must get a complete description of the child, generally including the information identified in FIG. 2, must describe the location of the incident, any information about the suspect and the incident itself. Then, all of this information must be properly formatted and approved for distribution as an alert.

According to embodiments of the present invention, the amount of time to create an emergency report for distribution as an emergency alert in step 405 has been documented to reduced what can be a multiple hour process to ten minutes. In the case of a child abduction, reported by a parent, the time to create an emergency report is greatly reduced when the parent presents the police with a storage device 225 that includes emergency information, such as a description and photograph of the child that is formatted to be read by the police computer system. The police computer system may include a program that reads the storage device 225 and populates an emergency alert form to be used in the case of child abductions that is properly formatted for use by the server 102. The police computer system may link to the server 102 and interact with a web page hosted by the server 102 to provide emergency information about the kidnapping, for example, by filling out the web page. The web page and/or the server 102 may be tailored to present different forms for different types of emergencies. In general, in these scenarios, the web page provides fields to fill in that include all of the emergency information that is required to report the emergency. Alternatively, the police computer may have a software program resident on it that presents the police officer with different forms tailored for different types of emergencies that the police officer is reporting.

In step 410, the police officer or agency employee (or contractor) enters the emergency alert information. When the form is completed in step 410, the police officer may upload the information stored on the computer as a result of completing the alert form to a server, such as the server 102. In the case of an emergency alert form being filled out through a web page, as well as the case of a form being filled out on the computer, the information generated is stored in a format that is usable by the server 102 to generate emergency alert messages to various devices.

In step 415, the police officer or agency employee notifies the control agency that he is preparing an emergency alert form to report an emergency through the emergency alert server or portal 102. The control agency may be the state police, for example, which would receive information from an officer, either over a radio or via the officer's computer and decide whether the incident warrants the use of the portal 102 to notify the public. When the control agency is the same agency that generates the report, there may be a management or reporting structure within the agency that defines who has the role of approving alerts for distribution to the public. In all cases, the control agency (or person) may make decisions about whether to issue the emergency information as an alert and, when approved, may provide a digital certificate or other credential to the server 102, and/or the agency computer that is creating the report to permit the emergency information to be distributed through the portal 102 to the public.

In step 420, the agency determines whether to approve issuance of the alert. If the agency does not approve the alert, then the process is aborted and will begin again when the emergency alert process is initiated again in step 400. If the agency approves the alert, then the agencies credential and approval are presented to the server or portal 102 to allow the corresponding emergency alert information to be distributed by the portal 102 to the public. The credential may be presented by a control agency computer 120 or the police computer 125 together with the emergency information. Alternatively, the credential and the emergency information may be presented at different times to the server 102. In this scenario, the credential and corresponding emergency information may be correlated in any convenient manner, including by assigning identification information to the emergency that is referenced by the credential and in the emergency information. All of the information exchanged between the agencies and the server 102 may be encrypted and otherwise protected.

In step 430, after the portal receives the emergency information and approval to proceed with an alert, the server 102 formats the information for distribution to the public through various devices. Because the information received from the agency is received in a particular format, the translation may proceed automatically by converting one format into various other formats. The server 102 includes software that performs translation into formats required by as many different devices (including computer systems) as desired. In step 430, the emergency alert information may include a sketch of the suspect. In addition, the emergency alert information may include an image of a car believed to be used by the suspect that is retrieved from a database of cars, and any other convenient information. The emergency alert message may be updated to include any additional information that is helpful. In addition, the emergency alert information may include a police agency's contact information, PR contact information, the URL of the emergency alert information so that any interested member of the public or broadcasting community can get the latest up to date information. Any other information desired may be reported.

The rapid dissemination of information about how to learn more about the incident or to report information about the incident may speed up the resolution of the emergency information. For example, in the case of kidnappings, the local police station trying to solve the kidnapping is usually overwhelmed with phone calls from the new media and the public upon the issuance of an alert, such as an "AMBER Alert." The large volume of phone calls can tie up the telephone system of the local police station and prevent them from fielding phone calls from the public with reports regarding sightings or the suspect or other information that may lead to the recovery of the child. By providing a PR contact and a police contact, and by making information available through the Internet and through law enforcement and/or media web site, fewer calls requesting information will go to the police allowing the police to better retrieve information from the public that will facilitate recovery of the child.

In step 435, the server 102 determines which devices should receive alerts based on locality. According to one embodiment of the invention, the locality of the emergency is described to the server 102 as part of the emergency information. In addition, the time of the emergency may be described. Based on this information, and the type of emergency, the server 102 runs a localization program that is used to determine which localities are affected at the present time, and over time.

For example, in the case of a kidnapping, the intersection and geographic area of the incident as well as the approximate time of the incident may be described in the emergency information provided to the server. The localization program initially may assign the zip code that includes the intersection as the affected locality. Over time, including the time that the server initially receives the emergency information, the server may calculate the surrounding zip codes, county or state into which the abductor could have gotten to based on elapsed time and the estimated travel time between the location of the incident and the surrounding areas. The server then expands the affected localities or zip codes over time based on the localization program.

A localization program may be used in the case of any other type of emergency to expand or change localities affected by an emergency over time. Once the localities are determined, then the server determines which devices to which to send the alert. In general, the server 102 sends the alert to all devices that are associated with affected localities. The server may make this determination based on the affected localities associated with the emergency information and/or the localization program and locality information, such as zip codes, associated with devices such as mobile telephones or PDA's, user computer systems, police computer systems (such as NLETS) or agency computer systems in different geographic areas, EAS systems, broadcaster computer systems and any other devices capable of receiving information. The type of emergency may also be used to determine the pool of devices from which devices are selected based on location, although location does not have to be used as a basis for determining whether to send the emergency alert to all devices. In step 440, the server sends the properly formatted emergency information to the various determined to be eligible to receive the alert.

In step 445, the server may determine whether the alert has been canceled for all or certain localities. If so, the server may issue an alert message canceling the alert to affected devices that received the initial alert in step 450. If not, then in step 455 the server may determine if the locality has changed for the alert as time elapses. If so, then step 435 begins again and additional devices or different devices may be determined as eligible to receive the emergency alert. In addition, in step 460, if the emergency information changes because updated by an agency or the police, the updated emergency information may be reformatted for distribution to various devices again in step 430 and an updated alert may be issued in the subsequent steps.

In this manner emergency information from different localities around a large geographic area, such as the United States, or multiple countries, is collected by a common server platform from an agency (or the police). The emergency information is then distributed to the public (and to other agencies, including the police, in different localities) and extrapolated over time to ensure that the emergency information is conveyed in a timely manner to those in different localities that are affected. In this manner, state boundaries between law enforcement agencies and other boundaries between geographic areas are overcome and emergency information is broadcast to the relevant public in an efficient and timely manner through as many channels as desired.

Figure 5:
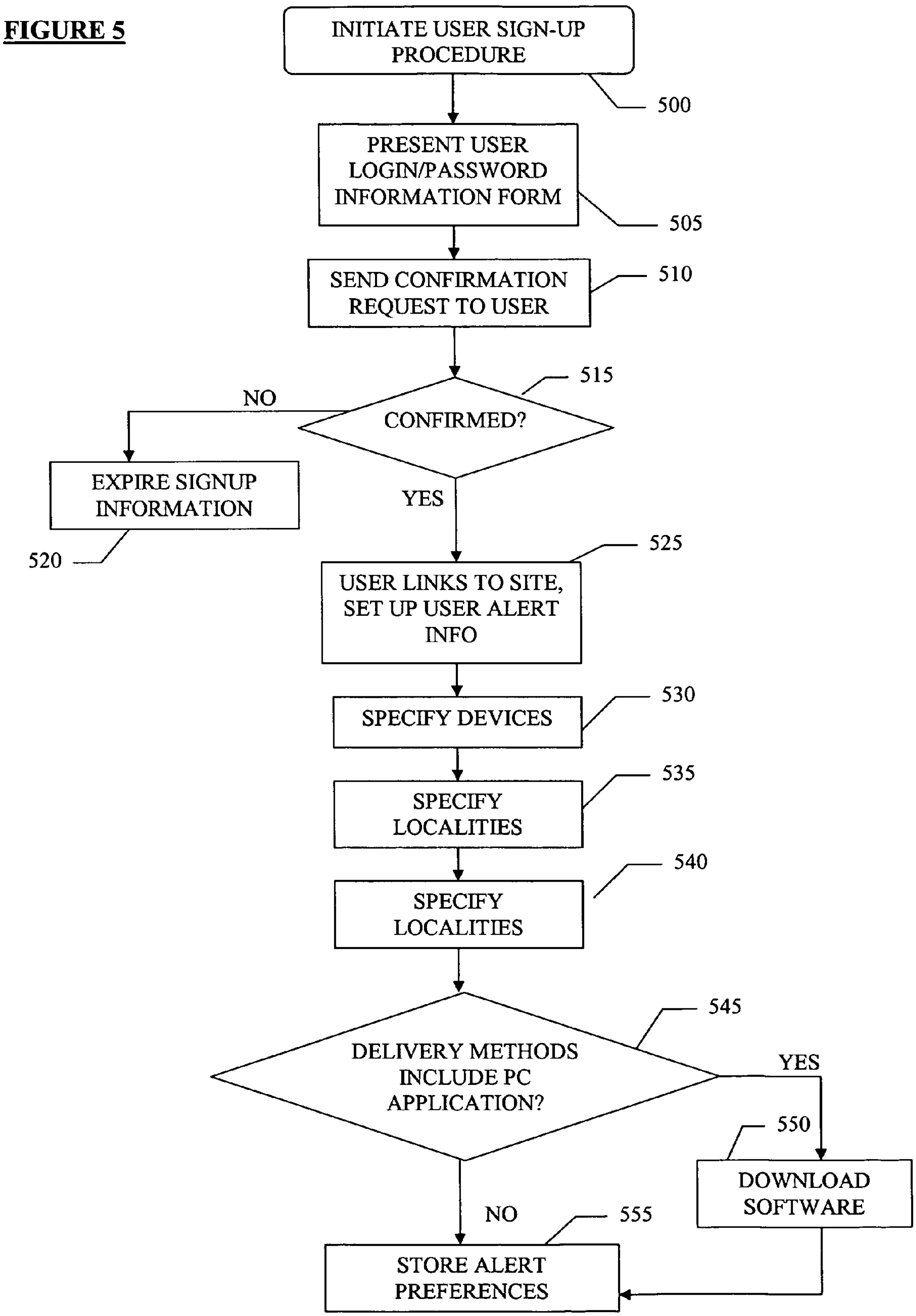
FIG. 5 depicts a method of enabling a new user to sign up to receive emergency alerts according to an embodiment of the present invention.

FIG. 5 depicts a method of enabling a new user (or agency user) to sign up to receive emergency alerts according to an embodiment of the present invention. Referring to FIG. 5, in step 500, the user initiates the sign up procedure. In step 505, a server 102 presents the user with a form, which may require the user to choose a login identification and password. In step 510, the user may be sent a confirmation request. In step 515, if the user does not confirm, the signup request may expire in step 520. If the user does confirm, then step 525 may begin.

In step 525, the user may set up alert information via the server 102. In step 530, the user may specify devices on which the user desires to receive alerts. The devices may be specified by any convenient identifier such as a telephone number, an email address, a URL, an IP address or any other convenient identifier. In step 535, the user may specify one or more localities with respect to which the user desires to receive emergency alerts. The localities may be specified by zip code, name, or in any other convenient manner. The user in step 240 may specify the types of alerts about which the user desires to be notified. For example, the user may choose to receive child kidnapping alerts. Alternatively, the user may choose to receive multiple alerts, including child kidnapping alerts, weather alerts and hazardous condition alerts. However, it will be understood that any system may be configured to permit or not permit selectivity with respect to alerts.

In step 545, if the user selected deliver to the user's personal computer or other device that requires a software download, then in step 450 the software may be downloaded to the user's device from a server. If no software download is required, then in step 555, the user's alert information is stored in the user alert database so that the user may receive alerts through the devices identified by the user to the alert system 100.

The process of FIG. 5 may or may not require a login and password. Moreover, the order of steps is not important. Accordingly, the user may first be prompted to identify a device, for example by wireless telephone number, and then may be prompted for other information. In addition, it will be understood that the user may sign up to receive alerts in different ways, for example, directly through the provider of the device or service through which the user desires to receive alerts. In any case, information identifying the user's device and the localities about which the user desires to receive alerts, as well as the types of alerts the user desires to receive may be stored in the user alert database for use by the system 100.

While particular embodiments of the present invention have been illustrated and described herein, it will be understood that changes may be made to those embodiments without departing from the spirit and scope of the present invention. For example, it will be understood that the processes of FIGS. 4 and 5 may be implemented in computer program instructions that cause the server 102 to perform the steps indicated. In addition, the order of the steps shown may be changed and not all of the steps need to be implemented depending on the particular implementation of the emergency alert system desired.

What is claimed is:

1. A method of distributing emergency alerts, comprising:

receiving emergency information describing an emergency, wherein the emergency information is received from an agency, wherein the emergency information is received via a network interface, and wherein the received emergency information has a predetermined format and includes a description of a child, a picture of the child, a description of an abductor, a location identified by an intersection or an address, a time of the abduction, and a description of an automobile;

retrieving a digital certificate from the agency to authenticate the emergency information using the network interface;

identifying a first affected locality using the location identified by an intersection or an address, and a difference between the time of the abduction and a first current time, the first affected locality increasing in size as the difference between the time of the abduction and the first current time increases;

distributing a first emergency alert associated with the received emergency information to a plurality of devices within the first affected locality using a wireless communications network;

identifying a second affected locality using the location identified by an intersection or an address, and a difference between the time of the abduction and a second current time, the second affected locality increasing in size as the difference between the time of the abduction and the second current time increases; and distributing a second emergency alert associated with the received emergency information to a plurality of devices within the second affected locality using the wireless communications network.

2. The method of claim 1, further comprising:

translating the received emergency information into different formats associated with a plurality of different user devices, wherein the type of format depends on the type of the user device and the type of the emergency, and wherein the plurality of different user devices are capable of operating in a plurality of different protocols; and transmitting the formatted emergency information to each of the respective plurality of different user devices.

3. The method of claim 2, further comprising:

storing information identifying user devices that are associated with alerts in at least one of a plurality of different localities; and performing the translating and transmitting with respect to each user device.

4. A system for handling emergency alert distribution, comprising:

a user alert database accessible via a network that stores information identifying user devices and at least one of a plurality of different localities, wherein the stored information is received via a network interface;

an emergency information database accessible via the network that stores emergency information, the emergency information being received via a network interface from an agency, and including a plurality of emergency events, each emergency event having a predetermined format and including a description of a child, a picture of the child, a description of an abductor, a location identified by an intersection or an address, a time of the abduction, and a description of an automobile;

a server device coupled to the user alert database and the emergency information database that allows users to access and identify the stored information identifying user devices and at least one of the plurality of different localities and that allows agencies to authenticate the emergency information for distribution as an emergency alert, wherein the users access and identify the stored information via a network interface, and wherein the server device is configured to:

receive emergency information describing an emergency from the emergency information database, wherein the received emergency information has a predetermined format and includes a description of a child, a picture of the child, a description of an abductor, a location identified by an intersection or an address, a time of the abduction, and a description of an automobile;

retrieve a digital certificate from the agency to authenticate the emergency information using the network interface;

identify a first affected locality using the location identified by an intersection or an address, and a difference between the time of the abduction and a first current time, the first affected locality increasing in size as the difference between the time of the abduction and the first current time increases;

distribute a first emergency alert associated with the received emergency information to a plurality of devices within the first affected locality using a wireless communications network;

identify a second affected locality using the location identified by an intersection or an address, and a difference between the time of the abduction, and a second current time, the second affected locality increasing in size as the difference between the time of the abduction and the second current time increases; and distribute a second emergency alert associated with the received emergency information to a plurality of devices within the second affected locality using the wireless communications network.

5. The system according to claim 4, wherein the server device further includes software that translates emergency information stored in a predetermined format into a plurality of different formats associated with different devices, and wherein the type of format depends on the type of the user device and the type of the emergency.

6. The system according to claim 5, wherein one format of the plurality of different formats includes an EAS system format.

7. The system according to claim 5, wherein one format of the plurality of different formats includes at least one format associated with an electronic traffic sign.

8. The system according to claim 5, wherein one format of the plurality of different formats includes a web page format associated with an uniform resource locator for an emergency corresponding to the emergency information.

9. The system according to claim 5, wherein one format of the plurality of different formats includes an electronic mail format for an emergency corresponding to the emergency information.

10. The system according to claim 5, wherein one format of the plurality of different formats includes at least one wireless device format for an emergency corresponding to the emergency information.

11. The system according to claim 10, wherein the at least one wireless device includes a mobile telephone.

* * * * *

UNITED STATES PATENT AND TRADEMARK OFFICE

CERTIFICATE OF CORRECTION

PATENT NO. : 7,603,432 B2
APPLICATION NO. : 11/144611
DATED : October 13, 2009
INVENTOR(S) : Chris J. Warner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 699 days.

Signed and Sealed this

Fourteenth Day of December, 2010

David J. Kappos
*Director of the United States Patent and Trademark Office*